Feb. 9, 1954 D. G. STALHANDSKE ET AL 2,668,361
GAUGE FOR MEASURING EXTERNAL DIMENSIONS
Original Filed Feb. 17, 1949 2 Sheets-Sheet 2
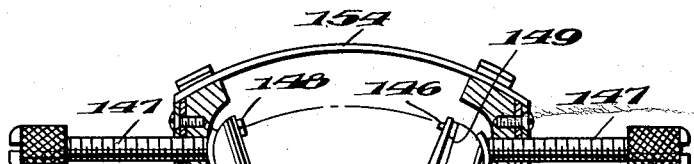
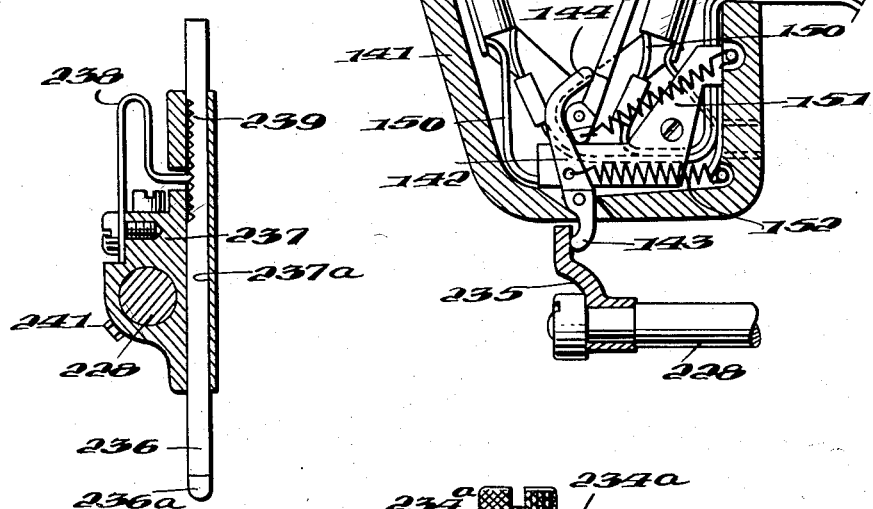
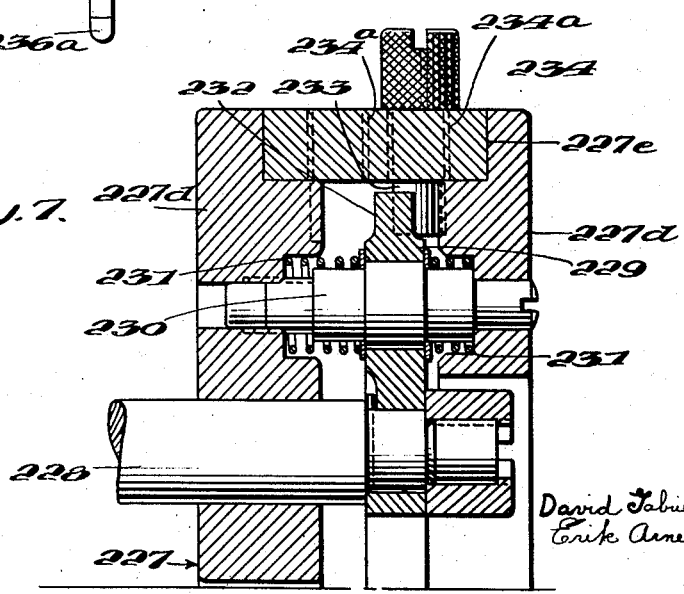
INVENTORS
David Gabriel Stalhandske
Erik Arne Johnson
BY Pierce, Scheffler & Parker
ATTORNEYS Patented Feb. 9, 1954

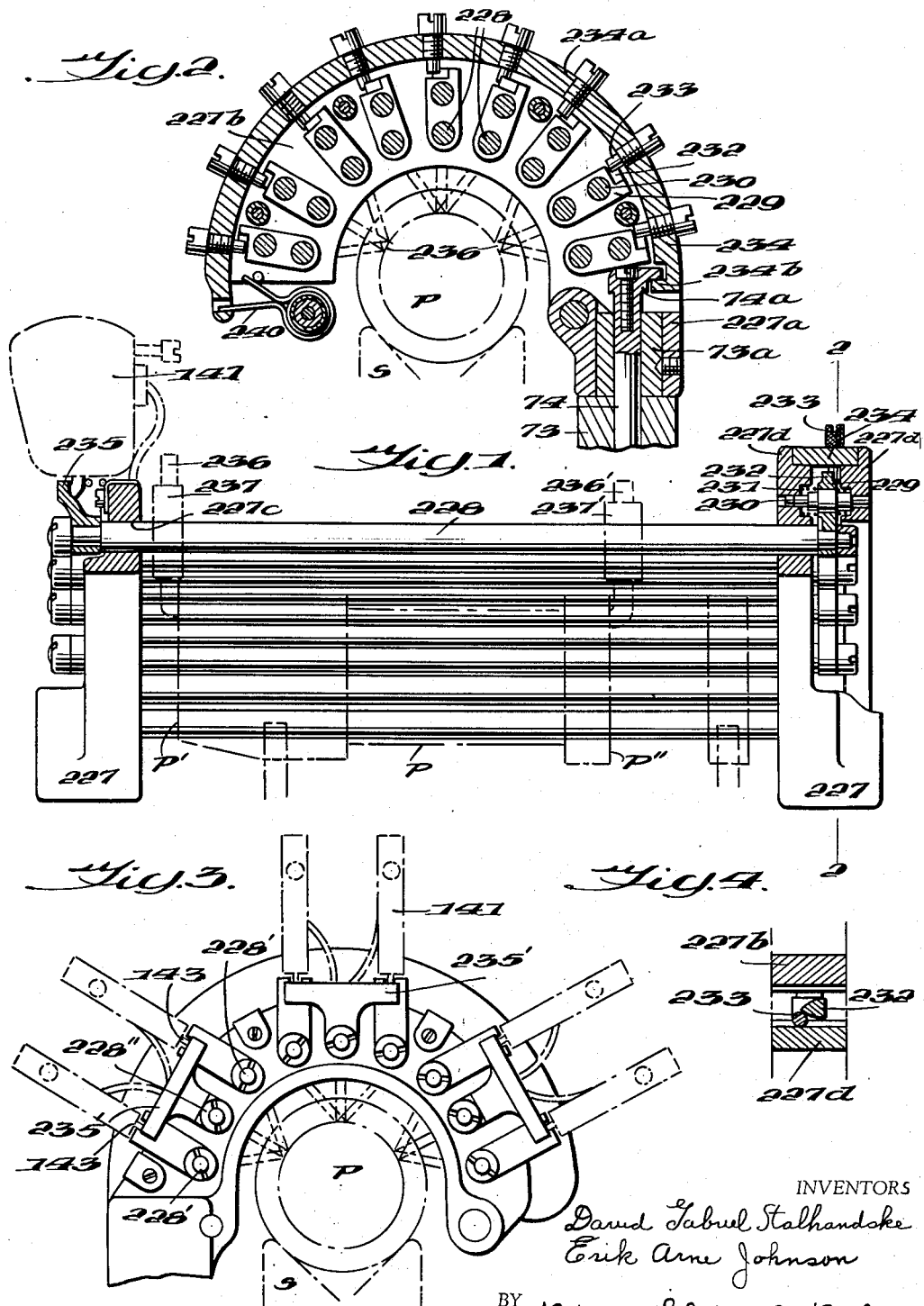

2,668,361

UNITED STATES PATENT OFFICE 2,668,361

GAUGE FOR MEASURING EXTERNAL DIMENSIONS

David Gabriel Stålhandske and Erik Arne Johnson, Bofors, Sweden

Original application February 17, 1949, Serial No. 76,894. Divided and this application October 1, 1951, Serial No. 249,053

9 Claims. (Cl. 33—174)

1

The present invention relates to gauges for measuring the dimensions of finished work pieces and is a division of our co-pending application Serial No. 76,894, filed February 17, 1949, relating to a machine for automatically gauging and sorting work pieces.

With machines of the above type it is often necessary to gauge what hereinafter may be called "outer lengths." Such are external dimensions in length measured axially of different parts of the work piece such as width of grooves, thickness of flanges, overall length, etc. The novel gauge which is hereinafter to be described is also adapted to measure one or a plurality of such dimensions simultaneously and each dimension gauged is converted into corresponding displacement of the movable element of an electrical contactor device, the latter serving to condition an electrical circuit controlling a sorting device at the sorter station by which any work piece whose dimension exceeds the selected tolerance is sorted out from the acceptable pieces upon arrival. The sorting station is more particularly described in our aforesaid co-pending application.

With reference now to the accompanying drawings which present a preferred embodiment of our invention:

Fig. 1 is a view in vertical longitudinal section of the gauge on line 1—1 of Fig. 2;

Fig. 2 is a view in vertical transverse section on line 2—2 of Fig. 1;

Fig. 3 is an end view of the gauge;

Figs. 4 and 5 are details;

Fig. 6 is a view in longitudinal vertical section of the electric contactor component of the gauge; and Fig. 7 is an enlarged view in section showing details of the actuating means for one of the gauging elements.

With reference now in particular to Figs. 1 and 2, the gauge body is seen to be comprised of end members 227 each of which includes a sleeve portion 227a adapted to fit upon the upper reduced end 73a of a vertically movable guide 73 located at each of the measuring stations as described in more detail in our aforesaid co-pending application, and a substantially semi-circular arcuate portion 227b. The arcuate portions 227b are provided with an arcuate row of spaced axial apertures 227c which are adapted to receive and support rods 228 that are movable axially in the apertures 227c parallel to the axis of the work piece P which is brought to the gauge station to be measured.

2

One of the arcuate end members 227, the one on the right as viewed in Fig. 1, is provided with axially spaced end walls 227d which establish an internal arcuate space for receiving a plurality of slides 229 which are utilized to effect longitudinal movement of rods 228 when a measurement is to be taken. Each slide 229 is mounted upon and intermediate the ends of a shaft 230, the shaft ends being supported in corresponding aligned horizontal apertures in the spaced walls 227d of member 227. As shown in Fig. 7 a pair of compression springs 231 are disposed respectively at opposite sides of and bear against each slide 229, and as explained later one or the other of the springs of each pair will be compressed by movement of the slide 229 to a neutral or starting position depending upon the direction of slide movement. The compressed spring is then utilized to actuate the slide 229 from such starting position when the measurements are taken. The inner end of each slide 229 is apertured axially to fit upon the end of rod 228 which is reduced in diameter to establish shoulder portions engaging opposite faces of the slide 229. Thus axial movement of the slides 229 will effect a corresponding axial movement of rods 228.

To effect axial displacement of the several slides 229 simultaneously, it will be seen that the outer end of each terminates in a double faced wedge 232 of the V type, Fig. 4. Cooperative with wedge 232 is a pin 233 which is carried in an arcuate member 234 slidable in a groove or way 227e provided in the outer periphery of the end wall members 227d. Slide 234 is provided with two parallel rows of apertures 234a for receiving the pins 233 the inner ends of which are adapted to engage one or the other of the faces of wedge 232, dependent upon which of the two apertures 234a is selected for pin 233. With pin 233 in the position shown in full lines in Figs. 1 and 4 rotation of slide 234 clockwise as viewed in Fig. 2 will cause slide 229 and hence the particular rod 228 associated therewith to move to the left from the position as viewed in Figs. 1 and 7. In a like manner, with pin 233 in the position indicated by broken lines, movement of slide 234 clockwise will effect a displacement of slide 229 and its associated rod 228 to the right.

In Fig. 2 it will be noticed that some of the pins 233 engage one face of the wedges 232 associated therewith while other pins engage the opposite face of the wedge. Thus some of the rods 228 will be displaced in one direction along their axis while others will be displaced in the opposite direction.

Motion of slide 234 is effected by means of a pull rod 74 which is slidable within guide 73. The upper end of rod 74 terminates in a detachably mounted toe 74a which is adapted to engage a corresponding toe 234b on slide 234. Thus when rod 74 occupies its lowermost position with respect to guide 73 which is the position taken when guide 73 occupies its raised position, slide 234 occupies such a position that all of the pins 233 have engaged their associated wedges 232 and moved their associated slides 229 and hence also the rods 228 and gauge elements 236 axially in the direction determined by the aperture selected for the pins 233 to a neutral or starting position. In such position one spring 231 of each spring pair will be compressed by axial displacement of its associated slide 229. When a measurement is to be taken guides 73 are caused to descend to a position adjacent the work piece with rods 74 still being held in their lowermost position relative to guides 73. When guides 73 come to a stop, rods 74 are caused to rise in their guides 73 and a cantilever spring 240 attached to the other end of the slide 234 is then free to rotate slide 234 counterclockwise thus moving pins 233 in the direction away from wedges 232 and permitting the force of compression stored in the springs 231 to move the slides 229 and hence rods 228 and gauge elements 236.

Each of the rods 228 as best seen in Fig. 5 is adapted to have mounted thereon a carrier 237 which slides along the rod and can be locked in any desired position along the rod and at any desired angle with respect to the rod axis by means of a set screw 241. The body of carrier 237 contains a bore 237a extending perpendicular to the axis of rod 228 for receiving the gauge or jaw member 236. The lower end of jaw 236 terminates in a toe 236a adapted to engage the surface of the work piece whose dimension is to be gauged and the upper portion is provided with a row of notches 239 for engagement with the free end of cantilever spring 238 secured to carrier 237. The notches 239 in conjunction with spring 238 provide for adjustment of jaw 236 longitudinally of itself in carrier 237 dependent upon the size of the machine part being gauged. Moreover while the spring 233 will normally retain jaw 236 at the position determined by the particular notch 239 selected, the impositive type of adjustment will nevertheless permit the jaw 236 to be pushed up into its carrier 237 if the surface of the work piece to be measured exceeds the maximum of the tolerance range by so much the jaw 236 upon a descent of guide 73 is caused to strike against the edge of the surface to be gauged rather than pass by the same.

The electrical contactor component of the gauge as best shown in Fig. 6 is adapted to close an electrical circuit when the dimension in question exceeds the maximum or is less than the minimum limit of tolerance chosen. The contactor device is comprised of a casing 141 housing a pair of stationary, spaced contact members 148, 149 each held against an adjustment screw 147 by means of a cantilever spring 150, and a pivotally mounted contact arm 145 having a contact 146 at its outer end adapted to move in an arcuate path between the stationary contacts 148, 149. A spring 151 loads arm 145 in the direction of contact 148. For actuating arm 145 a pivoted lever 142 is utilized. The upper end 144 of lever 142 bears against arm 145 and the lower end 143 protrudes from casing 141. Lever 142 is also loaded by a spring 152 so that the upper end 144 will always bear against arm 145 in such manner as to load the latter in the direction of stationary contact 149. The relationship between the two loading spring forces derived from spring 151 (acting directly upon arm 145) and spring 152 (acting directly upon lever 142) is so chosen that the latter will predominate with the result that in the rest position, as shown in Fig. 6, contact 146 on arm 145 will be pressed against stationary contact 149. As lever 142 is caused to turn counterclockwise however in a manner to be soon explained, spring 151 is then free to exert its force upon arm 145 causing the latter to follow and maintain contact with the upper end 144 of lever 142.

Reverting now to Fig. 1, a specific arrangement is there illustrated for gauging the distance between the end surfaces P' P'' of the work piece P. A jaw 236 and its carrier 237 is placed upon one of the rods 228 in such position that it will clear the end face P' of the work piece when the guides 73 are lowered after the work piece P has come into its gauging position on its support S. Another jaw 236' and its carrier 237' are placed upon an adjacent rod 228 in a similar position that will clear the opposite end face P'' of the work piece P.

Pin 233 associated with that rod 228 carrying jaw 236 is placed in the aperture that will cause the rod and hence also jaw 236 to be displaced to the left as viewed in Fig. 1, as slide 234 is rotated clockwise to the neutral or starting position, i. e. zero measurement, and pin 233 associated with the rod 228 carrying jaw 236' is placed in the aperture that will cause the rod and hence also jaw 236' to be displaced to the right. Consequently when guides 73 are lowered with the two rods 228 in the positions indicated, and rod 74 is then raised, slide 234 and pins 233 will rotate counterclockwise thereby permitting the compression force stored in the springs 231 to shift rods 228 in the opposite direction so that jaw 236 moves towards and engages the end surface P' of the work piece and jaw 236' moves towards and engages the end surface P''. An electrical contactor device as shown in Fig. 6 is mounted by bracket 155 upon and at the end of that rod 228 associated with jaw 236' and an arm 235 is mounted at the end of that rod 228 associated with jaw 236. Arm 235 is adapted to engage the lower end 143 of lever 142 of the electrical contactor device and hence as arm 235 and the contactor device move in opposite directions i. e. towards each other as the jaws 236 and 236' are brought into engagement with the opposite end faces P' and P'' of the work piece, the extent of the jaw displacement from its zero position will be reflected in a corresponding displacemennt of contactor arm 145. If the dimension thus measured is within the acceptable tolerance, arm 145 will reach a position intermediate the stationary contacts 148, 149. Should however the measured dimension fall below the minimum value in the tolerance range, arm 145 will be deflected far enough to effect engagement between contacts 146 and 148 and close the control circuit therethrough to set up a sort signal which will cause the defective work piece to become sorted out when it reaches the sorting station at the end of the line of gauging stations. Similarly, should the measured dimension exceed the maximum of the selected tolerance range, contact 146 will engage the other stationary contact 149 and set up preferably a different sort signal at the sorting station.

Should several different dimensions in length originate from the same surface of the work piece it is not necessary to arrange one pair of the rods 228 as described above for each dimension for this would mean that several of the jaws 236 would contact the same surface of the work piece. Instead, the more simple arrangement shown in Fig. 3 can be used. Here the rods are arranged in three groups, each group containing three rods. In each group, each of the outer two rods 228' carries one of the electrical contactor devices 141 and the middle rod 228'' carries an arm 235' adapted to engage the operating levers 143 of both contactor devices, the middle rod being that one which carries the jaw 236 adapted to contact the surface of the work piece common to the several dimensions in length to be gauged. Thus each group of three rods enables two dimensions from one and the same surface of the work piece to be gauged.

In conclusion we desire it to be understood that while the embodiment of our invention as described above is preferred, various minor changes in the construction and arrangement of component parts may be made without however departing from the spirit and scope of the invention as defined in the appended claims.

We claim:

1. A gauge for measuring external dimensions in length of a work piece comprising a pair of spaced end members, a plurality of rods extending between and journalled at their opposite ends in said end members for axial movement, a gauging jaw carried by each said rod, a slide individual to and coupled to each rod for actuating the same axially, said slides being carried by one of said end members and including a wedge portion the axes of which are parallel to the plane of said end member, a slide member disposed on said end member carrying said slides for movement substantially in a plane parallel to the end member and which includes the wedge members, said slide member being provided with a row of pins arranged longitudinally thereof for engagement respectively with the faces of the wedge portions of said slides upon movement of said slide member for displacing said slides axially to a starting position, and spring means cooperative with each said slide and rod for urging the same axially from said starting position to gauging position.

2. A gauge as defined in claim 1 wherein the said rods each include a carrier slidable therealong and having a bore therein extending perpendicular to the rod axis, said gauging jaw being mounted in said bore, and which further includes means maintaining said gauging jaw in a selected position of adjustment with respect to said carrier.

3. A gauge as defined in claim 2 wherein said gauging jaw is provided with axially spaced notches and wherein the means maintaining said gauging jaw in a selected position of adjustment is constituted by a spring on said carrier engageable with one of said notches in said gauging jaw.

4. A gauge for measuring external dimensions in length of a work piece comprising a pair of spaced arcuate end members, a plurality of rods extending between and journalled at their opposite ends in said end members for axial movement, a gauging jaw carried by each said rod, a slide individual to and coupled to each rod for actuating the same axially, said slides being carried by one of said end members and including a double faced wedge portion the axis of which is parallel to the plane of said arcuate end member, an arcuate slide member disposed within an arcuate groove in the said end member carrying said slides for movement in an arcuate path, a pair of rows of apertures in said slide member, said rows of apertures being disposed on opposite sides of said wedge portions, pins securable within said apertures for engagement with one or the other faces of the wedge portions of said slides upon movement of said slide member for displacing said slides axially to a starting position, the particular face engaged by said pin being dependent upon the aperture row selected therefor and determinative of the direction of displacement of said slide and rod upon movement of said slide member, and spring means cooperative with each said slide and rod for urging the same axially from said starting position.

5. Gauge structure as defined in claim 4 and which further includes an electrical contactor device having stationary and movable contacts and which is carried by one of a pair of said rods, and means carried by the other of said pair of rods for displacing said movable contact in accordance with the relative axial displacement effected between said pair of rods upon movement of said arcuate slide member.

6. Gauge structure as defined in claim 4 wherein said rods are arranged in one or more groups comprising at least three rods per group, two of the rods of said group each having an electrical contactor device mounted thereon having stationary and movable contacts and the third rod of said group having thereon an arm member adapted to effect a displacement of the said movable contact of each said contactor device in accordance with the relative axial displacement effected between said third rod and each of the two other rods.

7. Gauge structure as defined in claim 4 wherein said end members are supported upon guides movable to carry the gauge to and away from the work piece, and the guide associated with the end member mounting said arcuate slide member includes a bore therein containing a pull rod movable vertically and independently of said guide and which is connected with said arcuate slide member for actuating the same.

8. Gauge structure as defined in claim 4 wherein said spring means is comprised of a compression spring bearing against the face of the slide at the side thereof opposite that at which the said pin is located.

9. Gauge structure as defined in claim 4 wherein each said spring means is constituted by a compression spring at each side of each slide and bearing against the same, one of the two springs thus associated with each slide being compressed upon movement of the slide to said starting position.

DAVID GABRIEL STÅLHANDSKE.
ERIK ARNE JOHNSON.

References Cited in the file of this patent
UNITED STATES PATENTS

| Number | Name | Date |
|---|---|---|
| 2,511,276 | Ljungstrom | June 13, 1950 |